United States Patent
Perichon et al.

(10) Patent No.: US 12,506,355 B2
(45) Date of Patent: Dec. 23, 2025

(54) DUAL ACTIVE BRIDGE UNINTERRUPTIBLE POWER SUPPLY CIRCUIT

(71) Applicant: COMMISSARIAT A L'ENERGIE ATOMIQUE ET AUX ENERGIES ALTERNATIVES, Paris (FR)

(72) Inventors: Pierre Perichon, Grenoble (FR); Charley Lanneluc, Grenoble (FR); Léo Sterna, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/528,676

(22) Filed: Dec. 4, 2023

(65) Prior Publication Data
US 2024/0213798 A1    Jun. 27, 2024

(30) Foreign Application Priority Data
Dec. 22, 2022 (FR) .................................... 2214316

(51) Int. Cl.
*H02J 9/06* (2006.01)
*H02M 5/293* (2006.01)
*H02M 7/537* (2006.01)

(52) U.S. Cl.
CPC ........... *H02J 9/062* (2013.01); *H02M 5/2932* (2021.05); *H02M 7/537* (2013.01)

(58) Field of Classification Search
CPC ....... H02J 9/062; H02M 5/2932; H02M 7/537
(Continued)

(56) References Cited

U.S. PATENT DOCUMENTS

| | | | |
|---|---|---|---|
| 7,449,798 B2 * | 11/2008 | Suzuki ...................... | H02J 7/34 307/65 |
| 2013/0057200 A1 * | 3/2013 | Potts ....................... | H02J 50/12 320/107 |

(Continued)

*Primary Examiner* — Michael R. Fin
(74) *Attorney, Agent, or Firm* — BakerHostetler (57) ABSTRACT

An uninterruptible power supply circuit in the form of a dual active bridge converter includes first terminals which are configured to be connected to a first AC electrical network, second terminals which are configured to be connected to a second AC electrical network, and third terminals which are configured to be connected to a DC voltage source, the uninterruptible power supply circuit further comprising a transformer comprising a primary and a first secondary, a first electrical branch comprising the primary, the first electrical branch being connected to a first switch circuit configured to make it possible to exchange energy with the first terminals via the primary, and a second electrical branch comprising the first secondary, the second electrical branch being connected to a second switch circuit configured to make it possible to exchange energy with the second terminals via the first secondary. The first electrical branch comprises a first inductor connected in series with the primary, the second electrical branch comprises a second inductor connected in series with the first secondary, the transformer further comprises a second secondary, a third switch circuit being connected to the second secondary and being configured to make it possible to exchange energy with the third terminals via the second secondary, so as to make it possible to exchange energy between the first AC electrical network and the DC voltage source and between the DC voltage source and the second AC electrical network.

10 Claims, 6 Drawing Sheets

(58) Field of Classification Search
USPC .................................................. 307/64, 45
See application file for complete search history.

(56) References Cited

U.S. PATENT DOCUMENTS

2019/0386509 A1   12/2019  Liu et al.
2022/0278625 A1*  9/2022  Hirota ................. H02M 1/0058

* cited by examiner

DUAL ACTIVE BRIDGE UNINTERRUPTIBLE POWER SUPPLY CIRCUIT

CROSS-REFERENCE TO RELATED APPLICATION

This application claims priority to foreign French patent application No. FR 2214316, filed on Dec. 22, 2022, the disclosure of which is incorporated by reference in its entirety.

FIELD OF THE INVENTION

The invention relates to an uninterruptible power supply circuit, notably an uninterruptible power supply circuit configured to supply power to a second AC electrical network from a first AC electrical network, and, in the event of a failure of the first AC electrical network, supply power to the second AC electrical network from a DC voltage source.

BACKGROUND

Uninterruptible power supplies or UPSs are electrical devices intended to make continuity of service possible in the event of an interruption in the supply of electric power to an electrical system from an electrical network. By being the interface between the electrical network and the system, the uninterruptible power supply may also improve the quality of the energy offered by the electrical network. Banks, hospitals, universities or data centres are counted among the systems using UPSs.

Typically, a UPS is configured to perform two electrical conversions. In normal operation, the UPS implements an AC/AC conversion in which energy drawn from the AC electrical network is delivered to the AC electrical system. In the event of a failure of the AC electrical network, a DC/AC conversion between a DC voltage source, such as a battery, and the AC electrical system is implemented so as to continue supplying power to the AC electrical system.

Typically, the DC voltage source is rechargeable. Its voltage level must be sufficient to make it possible to supply power to the AC electrical system, at least for a transitory period. Generally, the DC voltage source may be recharged via an independent electric charger, which will charge the DC voltage source from the first AC electrical network. In order to supply power to the AC electrical system in the event of a breakdown of the AC electrical network, a UPS circuit and an electric charger circuit are therefore necessary. Now, in a context of reducing costs and improving efficiency, it would be advantageous to limit the number of electrical components required.

A solution which makes it possible to limit the electrical components in the use of an uninterruptible power supply which makes it possible for power to be supplied by an emergency DC voltage source, and of an electric charger intended to charge the emergency DC voltage source, is therefore sought.

SUMMARY OF THE INVENTION

To this end, the invention proposes an uninterruptible power supply circuit in the form of a dual active bridge converter comprising first terminals which are configured to be connected to a first AC electrical network, second terminals which are configured to be connected to a second AC electrical network, and third terminals which are configured to be connected to a DC voltage source, the uninterruptible power supply circuit further comprising:

i. a transformer comprising a primary and a first secondary;
ii. a first electrical branch comprising said primary, the first electrical branch being connected to a first switch circuit configured to make it possible to exchange energy with the first terminals via said primary; and
iii. a second electrical branch comprising said first secondary, said second electrical branch being connected to a second switch circuit configured to make it possible to exchange energy with the second terminals via said first secondary;

uninterruptible power supply circuit, wherein:

i. the first electrical branch comprises a first inductor connected in series with said primary;
ii. the second electrical branch comprises a second inductor connected in series with said first secondary;
iii. said transformer further comprises a second secondary, a third switch circuit being connected to said second secondary and being configured to make it possible to exchange energy with the third terminals via said second secondary;

so as to make it possible to exchange energy between the first AC electrical network and the DC voltage source and between the DC voltage source and the second AC electrical network.

By virtue of the first inductor, of the second inductor and of the second secondary, the second AC electrical network may be supplied with power by the first AC electrical network by transferring the energy from the first AC electrical network to the DC voltage source, then from the DC voltage source to the second AC electrical network. The DC voltage source serves to transitorily store the energy flowing from the first AC electrical network to the second AC electrical network. On this occasion, some of the energy may then be used to charge the DC voltage source. Thus, the electric charger is integrated into the uninterruptible power supply. Using an independent electric charger is therefore avoided. In particular, by virtue of the first inductor, of the second inductor and of the second secondary, the uninterruptible power supply circuit is configured to make it possible to exchange energy between the first electrical network and the DC voltage source, and between the second electrical network and the DC voltage source. From a functional point of view, it may be considered that, in the event of an energy exchange between the first and the second AC electrical network, it is carried out via the DC voltage source.

According to one embodiment, the power supply circuit is configured so that the switch circuits are controlled by phase differences, said energy exchanges depending on the phase differences between the first, the second and the third circuits.

According to one embodiment, the uninterruptible power supply circuit is configured so that a voltage at the second terminals of the uninterruptible power supply circuit is determined by a phase difference between the third circuit and the second circuit.

According to one embodiment, the uninterruptible power supply circuit is configured so that a voltage at the third terminals of the uninterruptible power supply circuit and/or a current at the first terminals of the uninterruptible power supply circuit are determined by a phase difference between the first circuit and the third circuit.

According to one embodiment, the uninterruptible power supply circuit comprises a control unit configured to determine said phase differences and control said switches depending on said phase differences.

According to one variant, said control unit comprises:
i. a first control block configured to deliver a setpoint power to the third terminals of the uninterruptible power supply circuit;
ii. a second control block configured to determine a setpoint current at the first terminals of the uninterruptible power supply circuit depending on said setpoint power and on an instantaneous voltage at the first terminals of the uninterruptible power supply circuit;
iii. a third control block configured to determine a phase difference between the first circuit and the third circuit depending on a difference between the setpoint current and an instantaneous current at the first terminals of the uninterruptible power supply circuit.

According to one variant, the first control block is configured to deliver a first setpoint power to the third terminals of the uninterruptible power supply circuit depending on a difference between a setpoint voltage and an instantaneous voltage at the third terminals of the uninterruptible power supply circuit.

According to one variant, the first control block is configured to deliver a second setpoint power depending on a power to be injected to the first terminals of the uninterruptible power supply circuit.

According to one variant, the first control block is configured to deliver the first setpoint power in the event of an energy exchange from the first terminals to the third terminals; and to deliver the second setpoint power in the event of an energy exchange from the third terminals to the first terminals.

According to one variant:
i. the first control block has an update frequency which is lower, notably at least ten times lower, than a frequency of the first AC electrical network; and
ii. the second control block and the third control block have update frequencies which are higher, notably at least twenty times higher, than a frequency of the first AC network.

According to one variant, said control unit comprises a fourth control block configured to determine the phase difference between the third circuit and the second circuit depending on a difference between a setpoint voltage at the second terminals of the uninterruptible power supply circuit and an instantaneous voltage at the second terminals of the uninterruptible power supply circuit.

According to one variant, said control unit is configured so as to control two of the three switch circuits with phase differences with respect to the remaining switch circuit, referred to as the "reference circuit".

According to one embodiment, the switches of the first, second and third circuits form a full switch bridge or a half switch bridge, respectively.

BRIEF DESCRIPTION OF THE DRAWINGS

Other features and advantages of the present invention will become more apparent on reading the following description with reference to the following appended figures.

DETAILED DESCRIPTION

Figure 1:
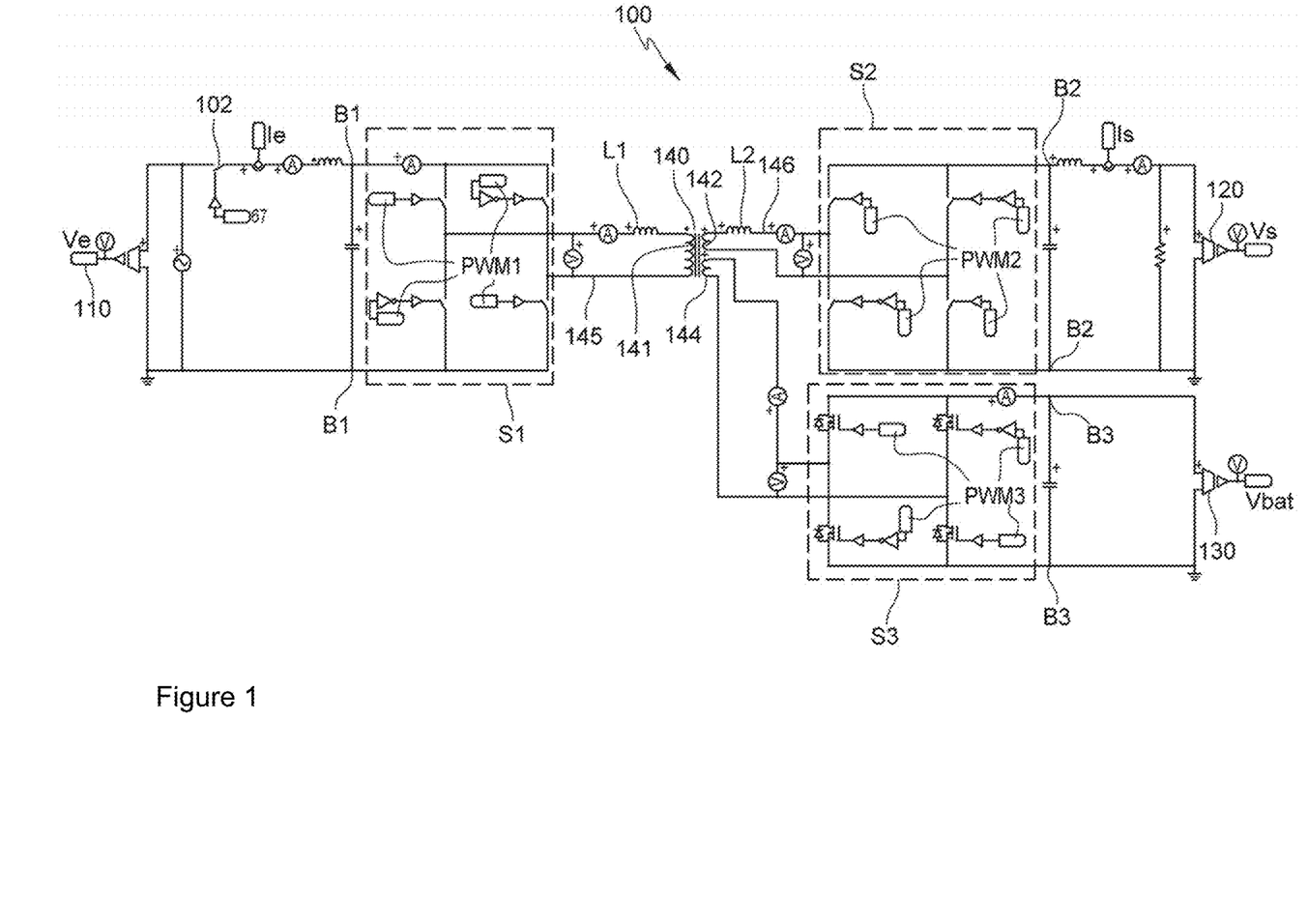
FIG. 1 shows an uninterruptible power supply circuit according to one example of the invention.

FIG. 1 presents an uninterruptible power supply circuit 100 according to one example of the invention. The power supply circuit 100 comprises first terminals B1 which are configured to be connected to a first AC electrical network 110 having a voltage Ve. The power supply circuit 100 also comprises second terminals B2 configured to be connected to a second AC electrical network 120 having a voltage Vs. Third terminals B3 are configured to be connected to a DC voltage source 130 having a voltage Vbat. Typically, the function of the power supply circuit 100 is to make it possible to supply power to the second AC electrical network 120 from the first AC electrical network 110. Also, in the event of a failure, to make it possible to supply emergency power to the second electrical network 120 from the DC voltage source 130. In particular, the DC voltage source 130 is rechargeable. It notably forms a temporary power supply, while a robust electrical source is started up, such as a generator set, for example. The DC voltage source 130 may be, inter alia, a battery, such as, for example, a lithium/lead battery, or a supercapacitor. The battery may be installed in a rack of the uninterruptible power supply circuit.

The power supply circuit 100 is in the form of a dual active bridge converter. The inventors have discovered that such a topology, which is known per se, is particularly advantageous for implementing a resonant power supply circuit, notably in that it makes it possible to integrate a function of charging the DC voltage source 130 into the uninterruptible power supply circuit 100. In particular, the dual active bridge converter topology makes possible direct AC/AC conversion without the need for intermediate rectification at the input or at the output of the uninterruptible power supply circuit; and resonant switching operation, which highly reduces the switching losses. Thus, the uninterruptible circuit according to the invention has an improved yield with respect to the prior art, notably of more than 97%. Furthermore, resonant switching operation makes it possible to switch the switches at a very high frequency, for example higher than 100 kHz. Whereas an uninterruptible power supply circuit of the prior art typically switches at a frequency of between 20 and 50 kHz. By virtue of this very high frequency operation, the volume of the uninterruptible power supply circuit may be reduced with respect to the prior art.

The power supply circuit 100 comprises a transformer 140 which comprises a primary 141 and a first secondary 142. The primary 141 of the transformer 140 is part of a first electrical branch 145 connected, notably at its terminals, to a first switch circuit S1. The first secondary 142 is part of a second electrical branch 146 connected, notably at its terminals, to a second switch circuit S2. A second secondary 144 is connected to a third switch circuit S3. By determining the current flowing through the first electrical branch 145, the first switch circuit S1 makes it possible to control the energy exchanged between the first terminals B1 and the rest of the uninterruptible power supply circuit 100, notably between the first AC network 110 and the rest of the uninterruptible power supply circuit 100. Likewise, the second switch circuit S2 makes it possible to control the energy exchanged between the second terminals B2 and the rest of the uninterruptible power supply circuit 100, notably between the second AC electrical network 120 and the rest of the uninterruptible circuit 100. The third switch circuit S3 makes it possible to control the energy exchanged between the third terminals B3 and the rest of the uninterruptible power supply circuit 100, notably between the DC voltage source 130 and the rest of the power supply circuit 100.

In the first electrical branch 145, a first inductor L1 is in series with the primary 141; and, in the second electrical branch 146, a second inductor L2 is in series with the first secondary 142. The first inductor L1 and the second inductor L2 make it possible to insert the DC voltage source 130 into the path of the energy between the first AC electrical network 110 and the second AC electrical network 120. The DC voltage source 130 thus makes it possible to transitorily store energy between the first AC electrical network 110 and the second AC electrical network 120.

This circuit architecture makes it possible to independently control an energy exchange between the primary 141 and the second secondary 144, on the one hand, and on the other hand between the second secondary 144 and the first secondary 142. Thus, a portion of the energy received by the DC voltage source 130 may be used to charge the DC voltage source 130.

The example of an uninterruptible power supply 100 comprises ammeters A and voltmeters V which are optional and make it possible to obtain measurements of the current and of the voltage in the circuit 100. The uninterruptible power supply circuit 100 may comprise filtering inductors or capacitors between, on the one hand, the first electrical network 110, the second electrical network 120 and the DC voltage source 130 and, on the other hand, the respective terminals B1, B2, B3 of the uninterruptible power supply circuit 100 to which they are connected. These filtering elements notably form EMC ("electromagnetic compatibility") filters in order to meet the standards on emission of electromagnetic interference in relation to the surrounding devices. The resonant operation of the uninterruptible power supply circuit according to the invention makes it possible to reduce the emitted EMC interference, and therefore the size of the EMC filters.

The switches of the first switch circuit S1, second switch circuit S2 and third switch circuit S3 are arranged in a full bridge. Thus, each switch circuit S1, S2, S3 comprises two switch arms connected between its respective terminals B1, B2, B3. In the first switch circuit S1 and second switch circuit S2, the electrical branch 145, 146 is connected to the midpoints of the two arms. In the third switch circuit S3, the second secondary 144 is connected to the midpoints of the arms. However, another switch arrangement may be envisaged. For example, the switches could be arranged in a half-bridge, a switch arm notably being replaced by a capacitor arm. The switches of the first circuit S1 and second circuit S2 are preferably bidirectional so as to make it possible to switch the AC current directly, thus making it possible to do without a rectification stage. The switches of the third circuit S3 may be unidirectional, which would be sufficient for operation with the DC voltage source 130. The switches are notably semiconductor switches, such as, for example, ones using GaN or SiC technology. Components using GaN or SiC technology are fast and well-adapted to high-frequency operation. Components using silicon technology are also possible, although possibly with a deterioration of the yield.

Figure 2:
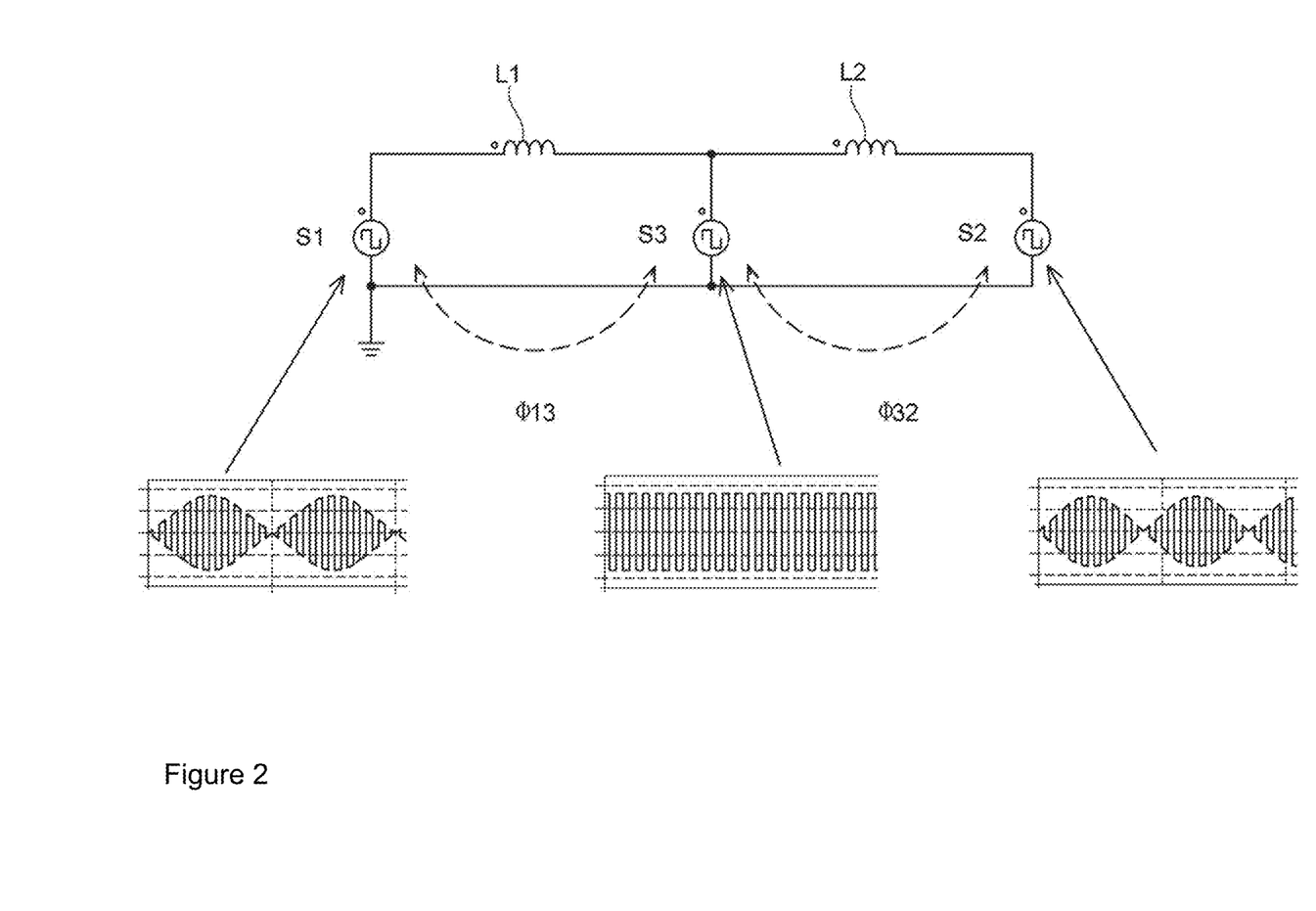
FIG. 2 shows a simplified circuit diagram of the uninterruptible power supply circuit illustrated in FIG. 1.

In order to control the energy exchanges in the uninterruptible power supply circuit 100, the switches of the first switch circuit S1, second switch circuit S2 and third switch circuit S3 are preferably controlled by phase difference. FIG. 2 presents a simplified circuit diagram of the electric power supply circuit 100. The first inductor L1 forms an input resonant inductor and the second inductor forms an output resonant inductor L2. The second secondary 144 and the third switch circuit S3 form an intermediate circuit between, on the one hand, the primary 141 and the first switch circuit S1 and, on the other hand, the first secondary 142 and the second switch circuit S2. The graphs in the bottom part of FIG. 2 show the current flowing through the primary 141, which is connected to the first switch circuit S1, the second secondary 144, which is connected to the third circuit S3, and the first secondary 142, which is connected to the second switch circuit S2, respectively. Notably, the switches of the switch circuits S1, S2, S3 are controlled with the same switching frequency and the same duty cycle. The switching frequency is, for example, between 100 and 500 kHz, notably equal to 100 kHz. The duty cycle is, for example, ½.

Notably, the phase difference $\phi_{13}$ between the first switch circuit S1 and the third switch circuit S3 determines the voltage at the third terminals B3, that is to say the DC voltage Vbat of the DC voltage source 130. Furthermore, this phase difference $\phi_{13}$ notably determines the current flowing through the first terminals B1 of the uninterruptible power supply circuit S1. In particular, when the uninterruptible power supply circuit 100 is in operation, the current flowing through the first terminals B1 is regulated so as to be in phase with the voltage Ve delivered by the first electrical network 110. In particular, the phase difference $\phi_{32}$ between the third switch circuit S3 and the second switch circuit S2 determines the voltage at the second terminals B2, that is to say the AC voltage Vs of the second AC electrical network 120.

Figure 3:
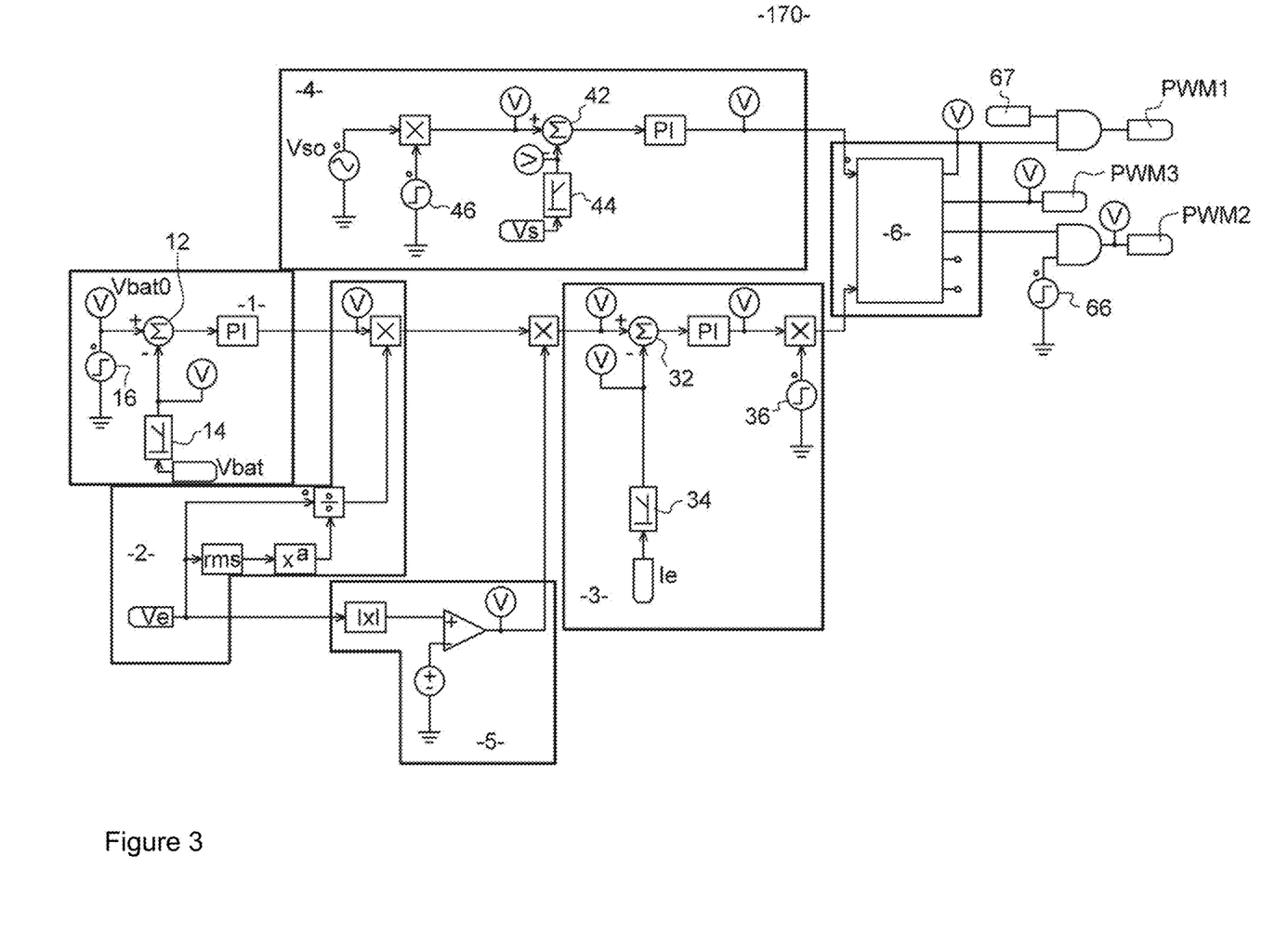
FIG. 3 shows one example of a control unit of the uninterruptible power supply circuit of FIG. 1.

In order to control the switches, the uninterruptible power supply 100 notably comprises a control unit 170 shown schematically in FIG. 3. The control unit 170 notably implements pulse-width modulation (PWM), by delivering opening/closure signals to the switches of the switch circuits S1, S2, S3.

The control unit 170 comprises a processing unit 6 which delivers signals PWM1, PWM2, PWM3 to the first switch circuit S1, second switch circuit S2 and third switch circuit S3, respectively. The processing unit 6 is notably an electronic unit, such as a microcontroller, for example. The processing unit 6 computes the signals PWM1, PWM2, PWM3, on the basis of phase differences determined by control blocks 1-5 described below.

A first control block 1 determines a setpoint power to be delivered to the third terminals B3. The first control block 1 notably forms a control loop. To this end, a unit 12 computes a difference between a setpoint voltage $V_{bat0}$ and an instantaneous voltage Vbat at the third terminals B3. Such a setpoint voltage $V_{bat0}$ corresponds to a nominal voltage of the DC voltage source 130, which is notably necessary for fulfilling its emergency power supply function. The instantaneous voltage Vbat may be measured between the third terminals B3. On the basis of this difference, the setpoint power, that is to say the power which must be delivered to the DC voltage source 130 in order to obtain a setpoint voltage $V_{bat0}$ at its terminals, is determined, notably using a proportional-integral corrector PI. The instantaneous voltage Vbat may be filtered by a low-pass filter 14 in order to improve the quality of the control block 1. An activation circuit 16 may be used to activate the block 1 when the DC voltage source 130 must be used by the uninterruptible power supply circuit 100.

A second control block 2 determines a setpoint current to be obtained at the first terminals B1 on the basis of the setpoint power delivered by the first block 1 and of the instantaneous voltage Ve between the first terminals B1, that is to say the voltage delivered by the first electrical network 110. The second block 2 obtains the setpoint current by dividing the setpoint power by the root-mean-square voltage squared and by multiplying it by the instantaneous voltage Ve, the root-mean-square voltage being obtained on the basis of the instantaneous voltage Ve. The setpoint current is determined so as to be in phase with the voltage Ve between the first terminals B1, and thus correct a power factor at the input of the uninterruptible power supply circuit 100.

A third control block 3 determines the phase difference $\phi_{13}$ between the first circuit S1 and the third circuit S3. The third control block 3 notably forms a control loop. To this end, a unit 32 computes a difference between the setpoint current delivered by the second block 2 and an instantaneous current Ie at the first terminals B1. The instantaneous current Ie may be measured at one of the first terminals B1. The phase difference $\phi_{13}$ is determined on the basis of this difference, notably using a proportional-integral corrector PI. The instantaneous current may be filtered by a low-pass filter 34 in order to improve the quality of the control block 2. An activation circuit 36 may be used to activate the second block 2 when the first AC electrical network 110 must be used by the uninterruptible power supply circuit 100.

The phase difference $\phi_{13}$ between the first circuit S1 and the third circuit S3 is therefore determined on the basis of two dynamics. One is implemented by the first control block 1 and aims to regulate the voltage between the third terminals B3, that is to say the voltage Vbat at the terminals of the DC voltage source 130. Another dynamic is implemented by the second control block 2, which aims to correct the power factor at the first terminals B1 of the uninterruptible power supply circuit 100. The third block 3, which aims to adjust the current at the first terminals B1, may be updated at the same frequency as the second control block 2. In particular, the first control block 1 has an update frequency which is slower than that of the second block 2 and of the third block 3, which makes it possible for these two dynamics to operate in parallel.

Furthermore, the first control block 1 preferably has an update frequency which is lower than the frequency of the first AC electrical network 110. The second control block 2 and the third control block 3 preferably have update frequencies which are higher than the frequency of the first AC electrical network 110. This is to ensure that the current delivered by the first AC electrical network 110 is indeed in phase with the voltage.

Notably, the first control block 1 has an update frequency which is at least ten times lower, or even 100 to 1000 times lower, than the frequency of the first AC electrical network 110. The second control block 2 and the third control block 3 notably have update frequencies which are at least twenty times, or even at least a hundred times, higher than the frequency of the first AC electrical network 110.

An additional control block 5 may be inserted between the second block 2 and the third block 3. This additional block 3 is known per se, and aims to avoid potential malfunctions when the voltage Ve delivered by the first AC electrical network 110 crosses zero. To this end, when the voltage Ve falls below a first voltage threshold, the output value is dragged to zero. When the voltage Ve rises above a second voltage threshold, the block 5 is put to sleep. For example, for a first AC electrical network 110 with a root-mean-square voltage of 230 V, the first and the second thresholds are between 10 and 20 V. The first and second thresholds are, in particular, equal.

The control unit 170 notably comprises a fourth control block 4, which determines the phase difference $\phi_{32}$ between the third circuit S3 and the second circuit S2. The fourth control block 4 notably forms a control loop. To this end, a unit 42 computes a difference between a setpoint voltage $V_{so}$ at the second terminals B2, that is to say a setpoint voltage of the second AC electrical network 120, and an instantaneous voltage Vs at the second terminals B2. The instantaneous voltage Vs may be measured between the second terminals B2. The phase difference ¢32 is determined on the basis of this difference, notably using a proportional-integral corrector PI. The instantaneous voltage Vs may be filtered by a low-pass filter 44 in order to improve the quality of the control block 4. An activation circuit 46 may be used to activate the fourth block 4 when the second AC electrical network 120 must be used by the uninterruptible power supply circuit 100.

The processing unit 6 determines the modulation signals PWM1, PWM2, PWM3, on the basis of the phase differences $\phi_{13}$, $\phi_{32}$ determined by the control blocks, with a switching frequency. The switch circuits S1-S3 may be controlled by taking the third switch circuit S3 as phase reference. However, the phase reference may be one of the other switch circuits. For example, if the first switch circuit S1 is the reference circuit, the signals PWM1, PWM2, PWM3 delivered to the first circuit S1, to the second circuit S2 and to the third circuit S3 may be as follows:

$$PWM1 = \text{sign}(\sin(W_d \times t)) \qquad \text{[Math 1]}$$

$$PWM3 = \text{sign}(\sin(W_d \times t - \Phi_{13})) \qquad \text{[Math 2]}$$

$$PWM2 = \text{sign}(\sin(W_d \times t - \Phi_{12})) \qquad \text{[Math 3]}$$

where t is time in seconds, $W_d$ is the switching pulse, sign is the function which returns the value of the sign of its argument, and $\phi_{12}$ is the phase shift between the first switch circuit S1 and the second switch circuit S2 such that $$\Phi_{12} = \Phi_{13} + \Phi_{32} \qquad \text{[Math 4]}$$

An activation circuit 66 may be used to activate transmission of the modulation signal PWM2 to the second switch circuit S2 when the second AC electrical network 120 must be used by the uninterruptible power supply circuit 100.

A signal 67 may be used to inhibit transmission of the modulation signal PWM1 to the first switch circuit S1 when the first AC electrical network 110 is not available. As illustrated, for example, in FIG. 1, this same signal 67 may be used to open a switch 102 so as to disconnect the first AC electrical network 110 from the first terminals B1 of the power supply circuit 100. This is notably the case when the first electrical network 110 fails.

In the control unit 170, the activation circuits 16, 36, 46, 66 are particularly useful for making it possible to sequence the starting of the uninterruptible power supply circuit 100.

They therefore notably make it possible to activate the elements of the power supply circuit 100 in the correct order.

Figure 4:
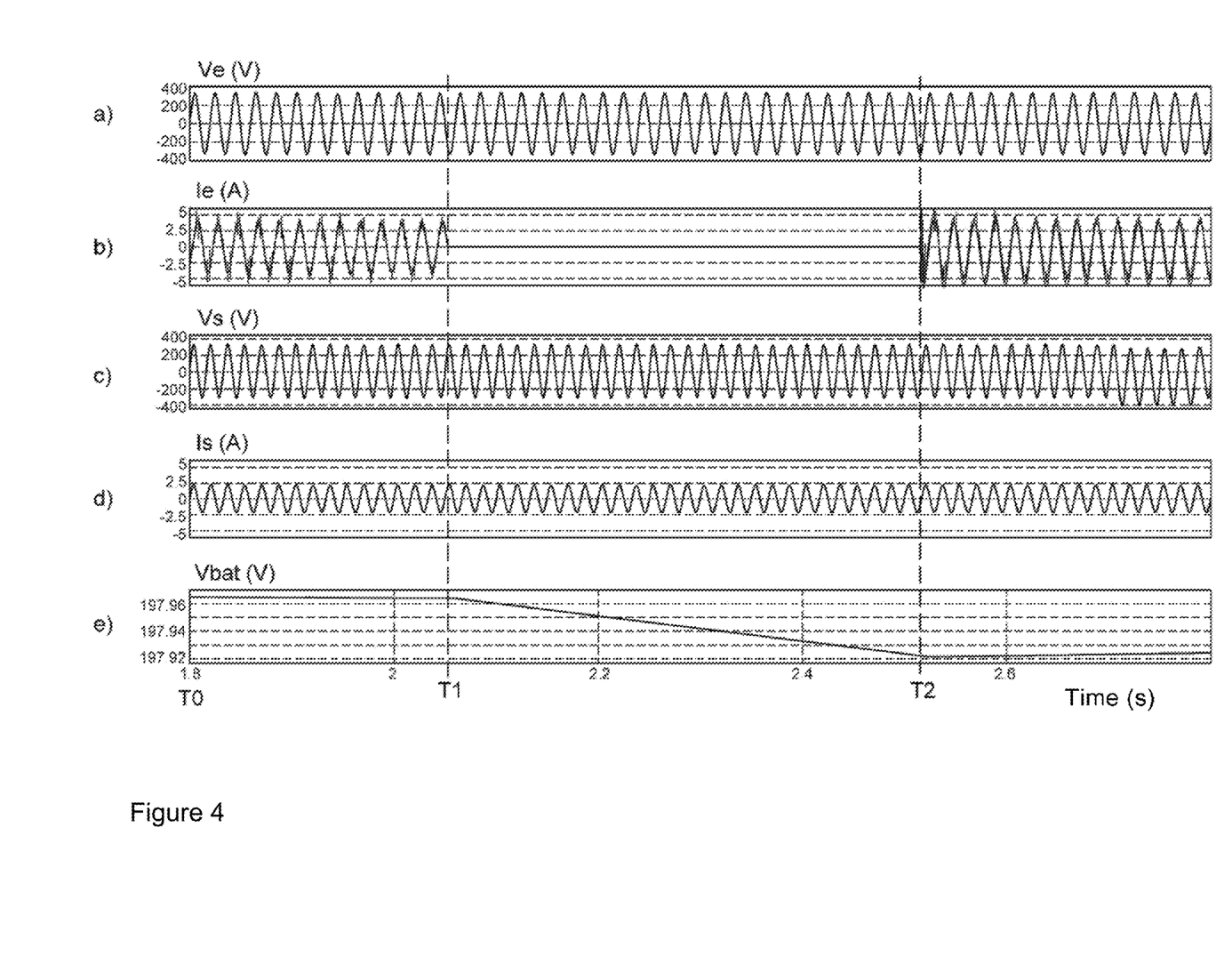
FIG. 4 shows the changes over time in currents and in voltages passing through one example of a power supply circuit comprising the control unit of FIG. 3.

FIG. 4 shows one example of currents and of voltages passing through the power supply circuit 100 when it is in operation. Graph a) shows the voltage Ve of the first AC electrical network 110. Graph b) shows the current Ie flowing through the first terminals B1 of the uninterruptible power supply circuit 100. Graph c) shows the voltage Vs delivered to the second AC electrical network 120. Graph d) shows the current Is flowing through the second terminals B2 of the uninterruptible power supply circuit 100. Graph e) shows the voltage Vbat of the DC voltage source 130.

Between the instants T0 and T1, the first AC electrical network 110 is connected to the uninterruptible power supply circuit 100 and delivers an AC voltage Ve to it. The voltage Ve delivered by the first AC electrical network 110 is characterized, for example, by a peak voltage of 325 V or a root-mean-square voltage of 230 V for a frequency of 50 Hz. The input current Ie is regulated so as to be in phase with the voltage Ve delivered by the first AC electrical network 110 and to make a substantially constant voltage Vbat, for example around 198 V, at the terminals of the DC voltage source 130 possible. A voltage Vs delivered to the second AC electrical network 120 is, for example, regulated at a peak voltage of 325 V or a root-mean-square voltage of 230 V for a frequency of 60 Hz. A sinusoidal current Is in phase with the voltage Vs flows through the second terminals B2 of the uninterruptible power supply circuit 100, since in this example the load connected to the second terminals B2 is a resistor. However, the current Is could be out of phase with the voltage Vs, notably if the load was inductive or capacitive.

At the instant T1, the first AC electrical network 100 is disconnected from the uninterruptible power supply circuit 100. The voltage VS at the terminals of the DC voltage source 130 decreases since it then supplies power to the second AC electrical network 120. It is found that the voltage Vs and the current Is are not impacted by this disconnection and are maintained by virtue of the emergency power supply provided by the DC voltage source 130.

At the instant T2, the first AC electrical network 110 is reconnected to the uninterruptible power supply circuit 100. It is again found that the voltage Vs and the current Is keep their shape. The voltage Vbat at the terminals of the DC voltage source 130 increases gradually, by virtue of the energy provided by the first AC electrical network 110. The speed at which the DC voltage source 130 is charged may be faster or slower depending on the power devoted to charging by the uninterruptible power supply circuit.

The uninterruptible power supply circuit 100 therefore correctly performs its emergency power supply function for the second AC electrical network 120, while at the same time making it possible to charge the DC voltage source 130 when the first AC electrical network 110 is operational.

More generally, the uninterruptible power supply circuit 100 makes it possible to exchange energy in all directions. For example, the DC voltage source 130 or the second AC electrical network 120 may send energy to the first AC electrical network 110. This is particularly advantageous when the first AC electrical network 110 experiences, in addition, high electricity consumption. Notably, the second AC electrical network 120 may provide energy when it contains means for producing energy, for example decentralized means for producing renewable energy. The aforementioned energy exchanges between the first AC electrical network 110 and the DC voltage source 130 and/or between the DC voltage source 130 and the second AC electrical network 130 may thus be negative.

The uninterruptible power supply circuit according to the invention may thus be used for network storage, that is to say storing and returning energy between the first AC network 110 and the DC voltage source 130, while at the same time providing a quality, uninterruptible AC voltage to the second AC electrical network 120.

In this application, during the storage phase, the uninterruptible power supply circuit 100 operates so as to ensure an uninterruptible power supply to the second AC electrical network 120. Energy is drawn from the first AC electrical network 110 in order to charge the DC voltage source 130, for example through regulation based on a setpoint voltage, and in order to meet the needs of the second AC electrical network 120. The first network 110 then provides the remainder of the power which is necessary for charging the DC voltage source 130 and of the power which is necessary to the second network 120 (through the DC voltage source).

The phase of releasing energy corresponds to injecting some of the energy stored in the DC voltage source 130 into the first AC electrical network 110. The uninterruptible power supply circuit 100 then behaves like an electrical energy producer in relation to the first AC electrical network 110. This may be desired, for example, in order to make storage/release judgements depending on the variations in the price of electricity, or as a service of supporting the balance between the supply and demand of electricity over the first AC electrical network 110. This service may be, for example, a service of assisting in regulating the frequency over the first AC electrical network 110. Such a regulation assistance service notably comprises injecting, into the latter, an electric power which depends on the deviation of the frequency of the first AC electrical network 110 from its reference frequency, notably below the latter. For example, the reference frequency is 50 Hz.

In the energy release phase, the power to be injected into the first AC electrical network 110 may be known. This power is notably released from the DC voltage source 130, which thus provides both the power injected into the first AC electrical network 110 and the power which is necessary to the second AC electrical network 120.

Figure 5:
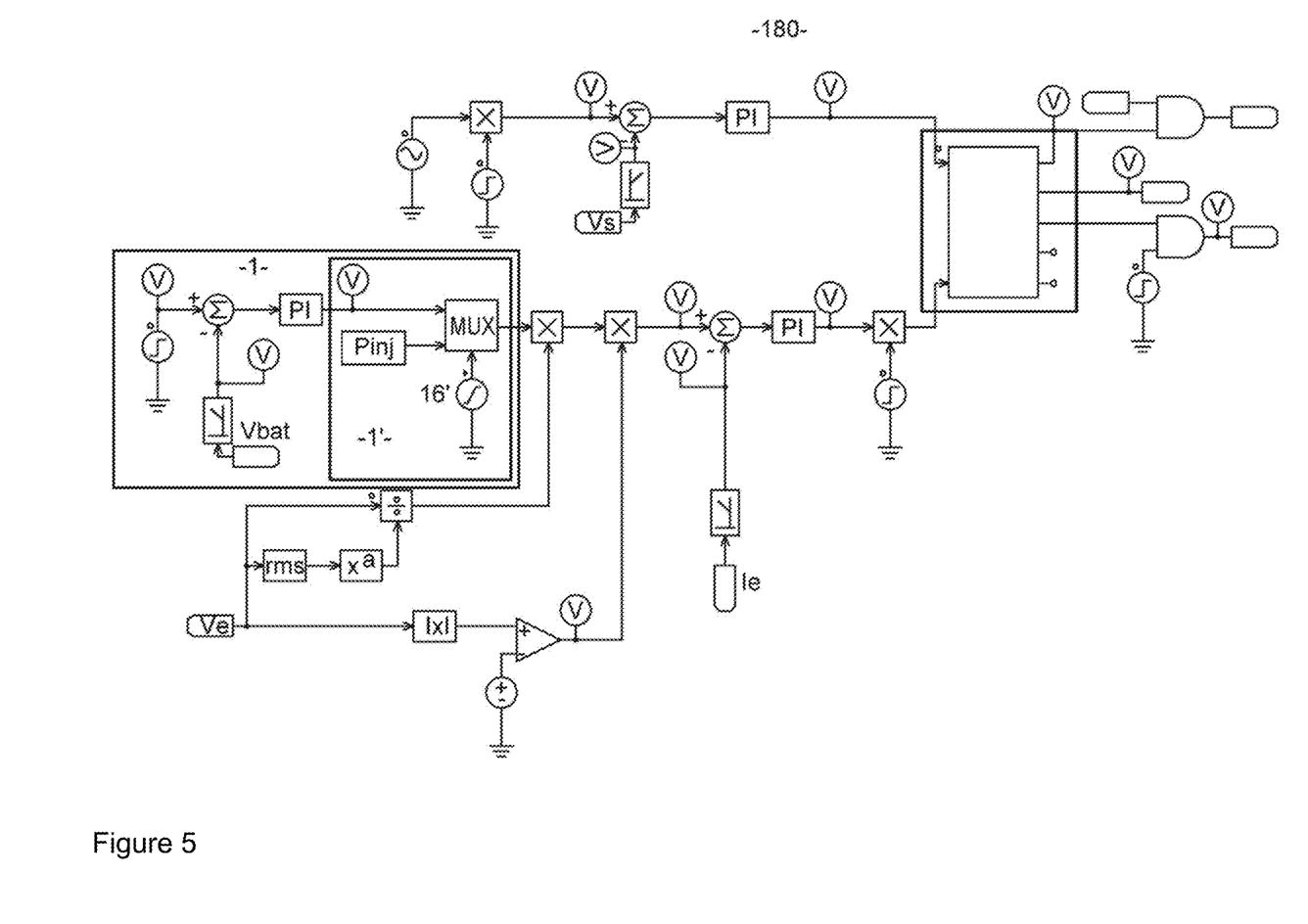
FIG. 5 shows another example of a control unit of the uninterruptible power supply circuit of FIG. 1.

In order to manage the release phase as well as possible, the uninterruptible power supply circuit 100 may comprise a control unit 180 shown schematically in FIG. 5.

This control unit 180 is similar to the control unit 170 illustrated in FIG. 3, except that the first control block 1 comprises a control sub-block 1'. The control sub-block 1' makes it possible to select either a first power determined depending on the difference between a setpoint voltage and an instantaneous voltage at the third terminals B3 of the circuit 100, or a second power Pinj to be injected into the first AC electrical network 110. To this end, the sub-block 1' may comprise a selection unit MUX which selectively connects the circuit delivering the first power or the circuit delivering the second power. An activation circuit 16' may be used to activate the sub-block 1' when the DC voltage source 130 must be used for the release of energy by the uninterruptible power supply circuit 100. The control sub-block 1' then delivers the selected power to the following control blocks as the setpoint power. The other control blocks operate as described above.

Figure 6:
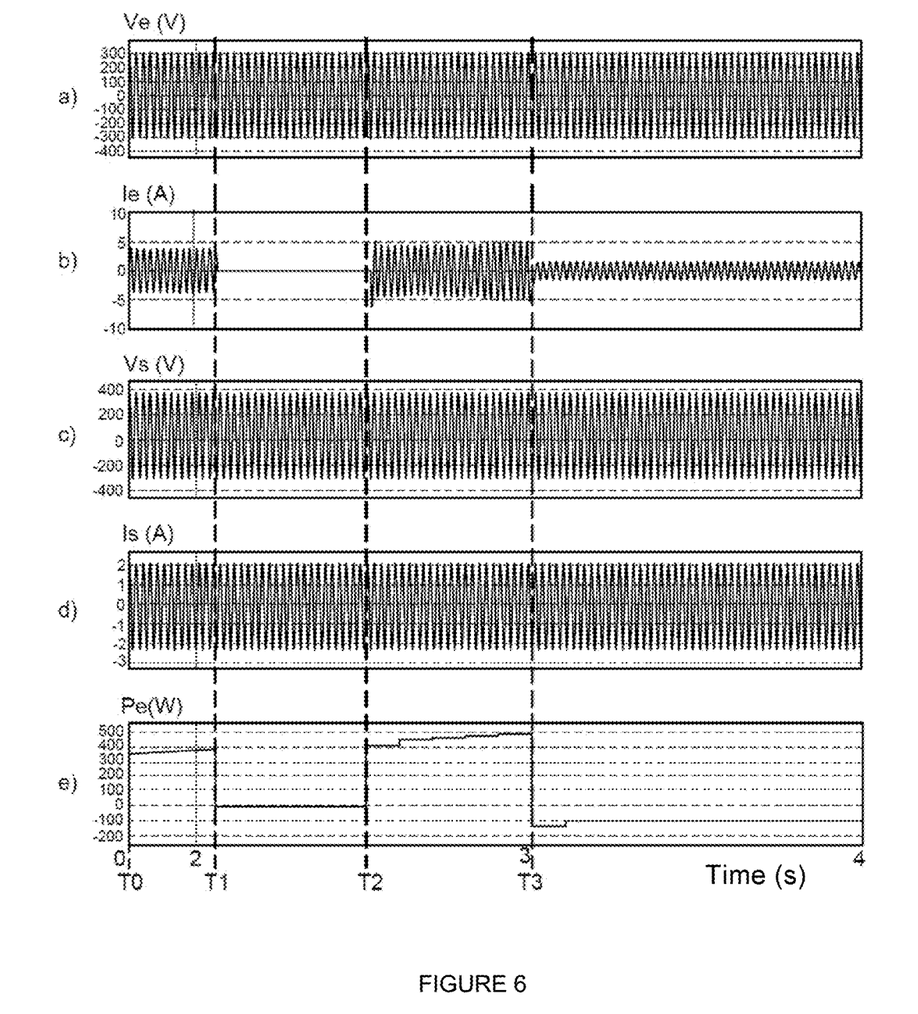
FIG. 6 shows the changes over time in currents and in voltages passing through one example of a power supply circuit comprising the control unit of FIG. 5.

FIG. 6 shows one example of currents and of voltages passing through the power supply circuit 100 in such storage and release operation in relation to the first electrical network 110, while at the same time ensuring the uninterruptible power supply to the second electrical network 120.

Graph a) shows the voltage Ve of the first AC electrical network 110. Graph b) shows the current Ie flowing through the first terminals B1 of the uninterruptible power supply circuit 100. Graph c) shows the voltage Vs delivered to the second AC electrical network 120. Graph d) shows the current Is flowing through the second terminals B2 of the uninterruptible power supply circuit 100. Graph e) shows the input power Pe, that is to say the power exchanged with the first AC electrical network 110.

Between the initial instant T0 and the instant T3, the circuit 100 without power supply operates similarly to the operation illustrated in FIG. 4. Between the instant T0 and the instant T1, the power supply circuit 100 operates so that the first electrical network 110 supplies power to both the DC voltage source 130—charging it if needed and the second electrical network 120. The input power Pe is positive. Then, at the instant T1, the circuit 100 without power supply moves into autonomous operation in which the second electrical network 120 is supplied with power only by the DC voltage source. The input power Pe is then zero, as the first electrical network 110 is disconnected. At the instant T2, the first electrical network 110 becomes available again, and restarts supplying power to the second electrical network 120, as well as recharging the DC voltage source 130, which was partially discharged during the autonomous operation phase. As may be seen in FIG. 6, after the instant T2, the input power Pe is higher than that over the period T0–T1, because the DC voltage source 130 was partially discharged and therefore needs to be recharged.

After a trigger event at the instant T3, the circuit 100 without power supply moves into a mode in which it injects electric power into the first electrical network 110. The input power becomes negative and is, for example, regulated at −100 W. To this end, the setpoint power delivered by the first control block is −100 W. After regulation, an electric power of 100 W is injected into the first network, originating from the DC voltage source 130, while the second electrical network 120 continues to be supplied with power uninterruptedly also from the DC voltage source 130. This power is typically injected into the first electrical network 110 by injecting a current Ie into the first electrical network 110 in phase opposition with the voltage Ve of the first electrical network 110. The injected power value of 100 W is purely illustrative. Other values are possible depending on the needs of the first electrical network 110 and the storage capacities of the DC voltage source 130 and/or the second electrical network 120.

The second electrical network 120 is correctly supplied with power uninterruptedly during all of the successive phases of operation. This demonstrates correct operation of the uninterruptible power supply circuit 100, notably in a context of network storage/release or of other services to the first network 110 requiring the injection of electricity which is available from the DC voltage source 130 or the second electrical network 120.

Thus, in the uninterruptible power supply circuit according to one embodiment of the invention, the first control block 1 may be configured to determine a setpoint power to be delivered to the third terminals B3 of the uninterruptible power supply circuit 100 depending on a difference between a setpoint voltage $V_{bat0}$ and an instantaneous voltage Vbat at the third terminals B3 of the uninterruptible power supply circuit 100, as, for example, illustrated in FIGS. 3 and 5. The first control block may, furthermore, be configured to determine the setpoint power depending on a power Pinj to be delivered to the first terminals B1 of the uninterruptible power supply circuit 100, as, for example, illustrated in FIG. 5.

The invention claimed is:

1. An uninterruptible power supply circuit in the form of a dual active bridge converter comprising first terminals (B1) which are configured to be connected to a first AC electrical network, second terminals (B2) which are configured to be connected to a second AC electrical network, and third terminals (B3) which are configured to be connected to a DC voltage source, the uninterruptible power supply circuit further comprising:
i. a transformer comprising a primary and a first secondary,
ii. a first electrical branch comprising said primary, the first electrical branch being connected to a first switch circuit (S1) configured to make it possible to exchange energy with the first terminals (B1) via said primary, and
iii. a second electrical branch comprising said first secondary, said second electrical branch being connected to a second switch circuit (S2) configured to make it possible to exchange energy with the second terminals (B2) via said first secondary;
wherein:
i. the first electrical branch comprises a first inductor (L1) connected in series with said primary,
ii. the second electrical branch comprises a second inductor (L2) connected in series with said first secondary, and
iii. said transformer further comprises a second secondary, a third switch circuit (S3) being connected to said second secondary and being configured to make it possible to exchange energy with the third terminals (B3) via said second secondary,
so as to make it possible to exchange energy between the first AC electrical network and the DC voltage source and between the DC voltage source and the second AC electrical network,
wherein the uninterruptible power supply circuit is configured so that the switch circuits (S1, S2, S3) are controlled by phase differences, said energy exchanges depending on the phase differences ($\Phi_{13}$, $\Phi_{32}$) between the first, the second and the third circuits (S1, S2, S3), and
wherein the uninterruptible power supply circuit is configured so that a voltage at the second terminals (B2) of the uninterruptible power supply circuit is determined by a phase difference ($\Phi_{32}$) between the third circuit (S3) and the second circuit (S2).

2. An uninterruptible power supply circuit in the form of a dual active bridge converter comprising first terminals (B1) which are configured to be connected to a first AC electrical network, second terminals (B2) which are configured to be connected to a second AC electrical network, and third terminals (B3) which are configured to be connected to a DC voltage source, the uninterruptible power supply circuit further comprising:
i. a transformer comprising a primary and a first secondary,
ii. a first electrical branch comprising said primary, the first electrical branch being connected to a first switch circuit (S1) configured to make it possible to exchange energy with the first terminals (B1) via said primary, and iii. a second electrical branch comprising said first secondary, said second electrical branch being connected to a second switch circuit (S2) configured to make it possible to exchange energy with the second terminals (B2) via said first secondary;

wherein:

i. the first electrical branch comprises a first inductor (L1) connected in series with said primary, ii. the second electrical branch comprises a second inductor (L2) connected in series with said first secondary, and iii. said transformer further comprises a second secondary, a third switch circuit (S3) being connected to said second secondary and being configured to make it possible to exchange energy with the third terminals (B3) via said second secondary, so as to make it possible to exchange energy between the first AC electrical network and the DC voltage source and between the DC voltage source and the second AC electrical network, wherein the uninterruptible power supply circuit is configured so that the switch circuits (S1, S2, S3) are controlled by phase differences, said energy exchanges depending on the phase differences ($\Phi_{13}$, $\Phi_{32}$) between the first, the second and the third circuits (S1, S2, S3), and wherein, the uninterruptible power supply circuit is configured so that a voltage at the third terminals (B3) of the uninterruptible power supply circuit and/or a current at the first terminals (B1) of the uninterruptible power supply circuit are determined by a phase difference ($\Phi_{13}$) between the first circuit (S1) and the third circuit (S3).

3. An uninterruptible power supply circuit in the form of a dual active bridge converter comprising first terminals (B1) which are configured to be connected to a first AC electrical network, second terminals (B2) which are configured to be connected to a second AC electrical network, and third terminals (B3) which are configured to be connected to a DC voltage source, the uninterruptible power supply circuit further comprising:

i. a transformer comprising a primary and a first secondary, ii. a first electrical branch comprising said primary, the first electrical branch being connected to a first switch circuit (S1) configured to make it possible to exchange energy with the first terminals (B1) via said primary, and iii. a second electrical branch comprising said first secondary, said second electrical branch being connected to a second switch circuit (S2) configured to make it possible to exchange energy with the second terminals (B2) via said first secondary;

wherein:

i. the first electrical branch comprises a first inductor (L1) connected in series with said primary, ii. the second electrical branch comprises a second inductor (L2) connected in series with said first secondary, and iii. said transformer further comprises a second secondary, a third switch circuit (S3) being connected to said second secondary and being configured to make it possible to exchange energy with the third terminals (B3) via said second secondary, so as to make it possible to exchange energy between the first AC electrical network and the DC voltage source and between the DC voltage source and the second AC electrical network, wherein the uninterruptible power supply circuit is configured so that the switch circuits (S1, S2, S3) are controlled by phase differences, said energy exchanges depending on the phase differences ($\Phi_{13}$, $\Phi_{32}$) between the first, the second and the third circuits (S1, S2, S3), wherein, the uninterruptible power supply circuit comprises a control unit configured to determine said phase differences ($\Phi_{13}$, $\Phi_{32}$) and control said switches depending on said phase differences ($\Phi_{13}$, $\Phi_{32}$), and wherein said control unit comprises:

i. A first control block configured to deliver a setpoint power to the third terminals (B3) of the uninterruptible power supply circuit;

ii. a second control block configured to determine a setpoint current (Ie) at the first terminals (B1) of the uninterruptible power supply circuit depending on said setpoint power and on an instantaneous voltage (Ve) at the first terminals (B1) of the uninterruptible power supply circuit; and iii. a third control block configured to determine a phase difference ($\Phi_{13}$) between the first circuit (S1) and the third circuit (S3) depending on a difference between the setpoint current and an instantaneous current (Ie) at the first terminals (B1) of the uninterruptible power supply circuit.

4. The uninterruptible power supply circuit according to claim 3, wherein the first control block is configured to deliver a first setpoint power to the third terminals (B3) of the uninterruptible power supply circuit depending on a difference between a setpoint voltage ($V_{bat0}$) and an instantaneous voltage ($V_{bat}$) at the third terminals (B3) of the uninterruptible power supply circuit.

5. The uninterruptible power supply circuit according to claim 3, wherein the first control block is configured to deliver a second setpoint power depending on a power (Pinj) to be injected to the first terminals (B1) of the uninterruptible power supply circuit.

6. The uninterruptible power supply circuit according to claim 4, wherein the first control block is configured to deliver the first setpoint power in the event of an energy exchange from the first terminals (B1) to the third terminals (B3); and to deliver the second setpoint power in the event of an energy exchange from the third terminals (B3) to the first terminals (B1).

7. The uninterruptible power supply circuit according to claim 3, wherein:

i. the first control block has an update frequency which is lower, notably at least ten times lower, than a frequency of the first AC electrical network; and ii. the second control block and the third control block have update frequencies which are higher, notably at least twenty times higher, than a frequency of the first AC electrical network.

8. An uninterruptible power supply circuit in the form of a dual active bridge converter comprising first terminals (B1) which are configured to be connected to a first AC electrical network, second terminals (B2) which are configured to be connected to a second AC electrical network, and third terminals (B3) which are configured to be connected to a DC voltage source, the uninterruptible power supply circuit further comprising:

i. A transformer comprising a primary and a first secondary, ii. a first electrical branch comprising said primary, the first electrical branch being connected to a first switch circuit (S1) configured to make it possible to exchange energy with the first terminals (B1) via said primary, and iii. a second electrical branch comprising said first secondary, said second electrical branch being connected to a second switch circuit (S2) configured to make it possible to exchange energy with the second terminals (B2) via said first secondary;

wherein:

i. The first electrical branch comprises a first inductor (L1) connected in series with said primary, ii. the second electrical branch comprises a second inductor (L2) connected in series with said first secondary, and iii. said transformer further comprises a second secondary, a third switch circuit (S3) being connected to said second secondary and being configured to make it possible to exchange energy with the third terminals (B3) via said second secondary, so as to make it possible to exchange energy between the first AC electrical network and the DC voltage source and between the DC voltage source and the second AC electrical network, wherein the uninterruptible power supply circuit is configured so that the switch circuits (S1, S2, S3) are controlled by phase differences, said energy exchanges depending on the phase differences ($\Phi_{13}$, $\Phi_{32}$) between the first, the second and the third circuits (S1, S2, S3), and wherein said control unit comprises a fourth control block configured to determine the phase difference ($\Phi_{32}$) between the third circuit (S3) and the second circuit (S2) depending on a difference between a setpoint voltage ($V_{SO}$) at the second terminals (B2) of the uninterruptible power supply circuit and an instantaneous voltage ($V_S$) at the second terminals (B2) of the uninterruptible power supply circuit.

9. An uninterruptible power supply circuit in the form of a dual active bridge converter comprising first terminals (B1) which are configured to be connected to a first AC electrical network, second terminals (B2) which are configured to be connected to a second AC electrical network, and third terminals (B3) which are configured to be connected to a DC voltage source, the uninterruptible power supply circuit further comprising:

i. A transformer comprising a primary and a first secondary, ii. a first electrical branch comprising said primary, the first electrical branch being connected to a first switch circuit (S1) configured to make it possible to exchange energy with the first terminals (B1) via said primary, and iii. a second electrical branch comprising said first secondary, said second electrical branch being connected to a second switch circuit (S2) configured to make it possible to exchange energy with the second terminals (B2) via said first secondary;

wherein:

i. the first electrical branch comprises a first inductor (L1) connected in series with said primary, ii. the second electrical branch comprises a second inductor (L2) connected in series with said first secondary, and iii. said transformer further comprises a second secondary, a third switch circuit (S3) being connected to said second secondary and being configured to make it possible to exchange energy with the third terminals (B3) via said second secondary, so as to make it possible to exchange energy between the first AC electrical network and the DC voltage source and between the DC voltage source and the second AC electrical network, wherein the uninterruptible power supply circuit is configured so that the switch circuits (S1, S2, S3) are controlled by phase differences, said energy exchanges depending on the phase differences ($\Phi_{13}$, $\Phi_{32}$) between the first, the second and the third circuits (S1, S2, S3), wherein said control unit is configured so as to control two of the three switch circuits with phase differences with respect to the remaining switch circuit, referred to as the "reference circuit".

10. The uninterruptible power supply circuit according to claim 1, wherein the switches of the first, second and third circuits (S1, S2, S3) form a full switch bridge or a half switch bridge, respectively.

* * * * *